(12) United States Patent
Kawachi et al.

(10) Patent No.: US 6,997,612 B2
(45) Date of Patent: Feb. 14, 2006

(54) SLIDING MEMBER

(75) Inventors: Toshiaki Kawachi, Nagoya (JP); Hideo Ishikawa, Nagoya (JP); Masaaki Sakamoto, Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 115 days.

(21) Appl. No.: 10/238,490

(22) Filed: Sep. 10, 2002

(65) Prior Publication Data

US 2003/0095731 A1 May 22, 2003

(30) Foreign Application Priority Data

Sep. 10, 2001 (JP) .............................. 2001-273093

(51) Int. Cl.
*F16C 33/00* (2006.01)

(52) U.S. Cl. ..................... 384/42; 384/276; 384/912

(58) Field of Classification Search ................ 384/276, 384/294, 912, 129, 42
See application file for complete search history.

(56) References Cited

U.S. PATENT DOCUMENTS 6,451,452 B1 * 9/2002 Niegel et al. ................ 384/912

FOREIGN PATENT DOCUMENTS

GB 2348 210 A 9/2000
JP 11 50296 2/1999

OTHER PUBLICATIONS

Japanese Abstract 2001-020955 published Jan. 23, 2001.

* cited by examiner

*Primary Examiner*—Lenard A. Footland
(74) *Attorney, Agent, or Firm*—Rader, Fishman & Grauer PLLC

(57) ABSTRACT

An overlay layer is formed on a bearing alloy layer via an intermediate layer. The overlay layer consists of Bi or a Bi alloy, and 0.05 to 25 vol % of hard particles. While the overlay layer is made of Bi or a Bi alloy, wear resistance thereof can be improved by adding the hard particles.

1 Claim, 1 Drawing Sheet

SLIDING MEMBER

BACKGROUND OF THE INVENTION

The present invention relates to a sliding member comprising an overlay layer made of Bi (bismuth) or a Bi alloy.

The present invention relates to a sliding member comprising a bearing alloy layer and an overlay layer using Bi or a Bi alloy which is formed on the bearing alloy layer.

In internal-combustion engines of motor vehicles, for example, there have been used sliding bearings with utilization of a copper-based or aluminum-based bearing alloy, on each of which usually an overlay layer is formed to improve conformability. The overlay layer has been conventionally made of a soft lead alloy or in some cases, an Sn alloy.

However, it is preferable not to use Pb because Pb is an environmental pollution substance, if it is possible to do so. Thus, various researches and developments have been conducted heretofore, for example, there is proposed the use of Bi or a Bi alloy instead of the Pb alloy in JP-A-2001-20955.

However, when the overlay layer of Bi or the Bi alloy is formed by electroplating because Bi lacks malleability, it is hard to make it thick. Therefore, in the case where the overlay layer is formed with Bi or the Bi alloy, there arises a problem that it is inferior in wear resistance property.

The present invention has been achieved under the above-mentioned background.

BRIEF SUMMARY OF THE INVENTION

An object of the invention is to provide a sliding member which uses Bi or a Bi alloy as the overlay layer while making it possible to improve wear resistance.

In order to achieve the above object, according to the invention, there is provided a sliding member comprising a bearing alloy layer and an overlay layer which is formed on the bearing alloy layer, wherein the overlay layer consists of a matrix of Bi or a Bi alloy, and 0.05 to 25 vol % of hard particles.

The hard particles contribute to the improvement of wear resistance. When forming the overlay layer with utilization of Bi or the Bi alloy, even if the thickness of the overlay layer is small, it is possible to improve the overlay layer in wear resistance by adding the hard particles thereto. On the other hand, while Bi or the Bi alloy has a relatively low melting point and is liable to flow under a high temperature, the additive hard particles control it not to flow and make it possible to have improved anti-seizure property.

In this case, if the content of the hard particles is less than 0.05 vol %, it is impossible to attain the effect of improving wear resistance by the hard particles. If the content exceeds 25 vol %, the overlay layer exhibits lack of elongation and inferior conformability, and cracks or exfoliation are liable to occur, when it is used as a bearing, whereby the effect of improving wear resistance can not be attained.

The maximum particle size of the hard particles is preferably not more than 5 $\mu$m.

While the overlay layer of a Pb alloy has usually from 15 to 30 $\mu$m of thickness, when the overlay layer of Bi or the Bi alloy is formed by electroplating, a thickness thereof will be 5 to 15 $\mu$m, since it is hard to make its thickness large. In this case, when the particle size of the hard particles added in the overlay layer is more than 5 $\mu$m, the hard particles not only attack a mating member comparatively hard but also adversely affect a formation of oil film when it is used as bearing, whereby the anti-seizure property of the overlay layer might be deteriorated.

The additive hard particles may be any one selected from the group consisting of boride, silicide, oxide, nitride, carbide and an inter-metallic compound.

The boride includes NiB, $Ni_3B$, CrB, $ZrB_2$, CoB, $TiB_2$, $VB_2$, $TaB_2$, WB, MoB, an Fe—B system and so on.

The silicide includes $TiSi_2$, $WSi_2$, $MoSi_2$, $TaSi_2$, $CrSi_2$, an Fe—Si system, a Mn—Si system and so on.

The oxide includes $SiO_2$, $Al_2O_3$, $TiO_2$, $ZrO_2$, WO, $MoO_3$, a Mn—O system, an Fe—O system, a V—O system and so on.

The nitride includes $Si_3N_4$, TiN, ZrN, TaN, VN, AlN, C—BN, $Cr_2N$ and the like, the carbide includes WC, SiC, $B_4C$, TiC, TaC, VC, ZrC and so on.

The inter-metallic compound includes a Ni—Sn system, an Fe—W system, an Fe—Mo system, an Fe—Mn system, an Fe—Cr system, an Fe—Al system, a Cr—Al system, a V—Al system, a Ti—Al system, a W—Al system and so on.

Other hard particle materials than the above include a Ni-base self-fluxing alloy (e.g. a Ni—B—Si system) and a Co-base self-fluxing alloy (e.g. a Co—Mo—Si—B system).

The overlay layer is preferably formed on the bearing alloy layer via an intermediate layer in order to enhance the bonding strength between the overlay layer and the bearing alloy layer. The intermediate layer is preferably any one metal selected from the group of Ni, Co, Fe, Cu and Ag, or an alloy of which major component is any one of the above metals.

In the case where the intermediate layer is made of Sn or an Sn alloy, for example, an adhesiveness can be obtained by a diffusion bonding according to which Sn diffuses into Bi to form a compound. However, in the case of such diffusion bonding, when the temperature of a bearing surface reaches a high temperature of one hundred and several tens degree centigrade under a high surface pressure in use, there arises a disadvantage that the overlay layer may be exfoliated since the compound, having a low melting point, generated by diffusion grows.

In contrast, among Ni, Co, Fe, Cu and Ag mentioned above, Cu and Ag bond with Bi by virtue of an atomic bond which ensures bonding strength, whereby the exfoliation problem of the overlay layer under a high temperature hardly arises thereby resulting in excellent bonding strength. Also, with regard to Ni, Co and Fe, a similar bonding property can be expected.

It should be noted that, in the present invention, the bearing alloy may be either a Cu alloy or an Al alloy.

BRIEF DESCRIPTION OF EMBODIMENTS OF THE INVENTION

Figure 1:
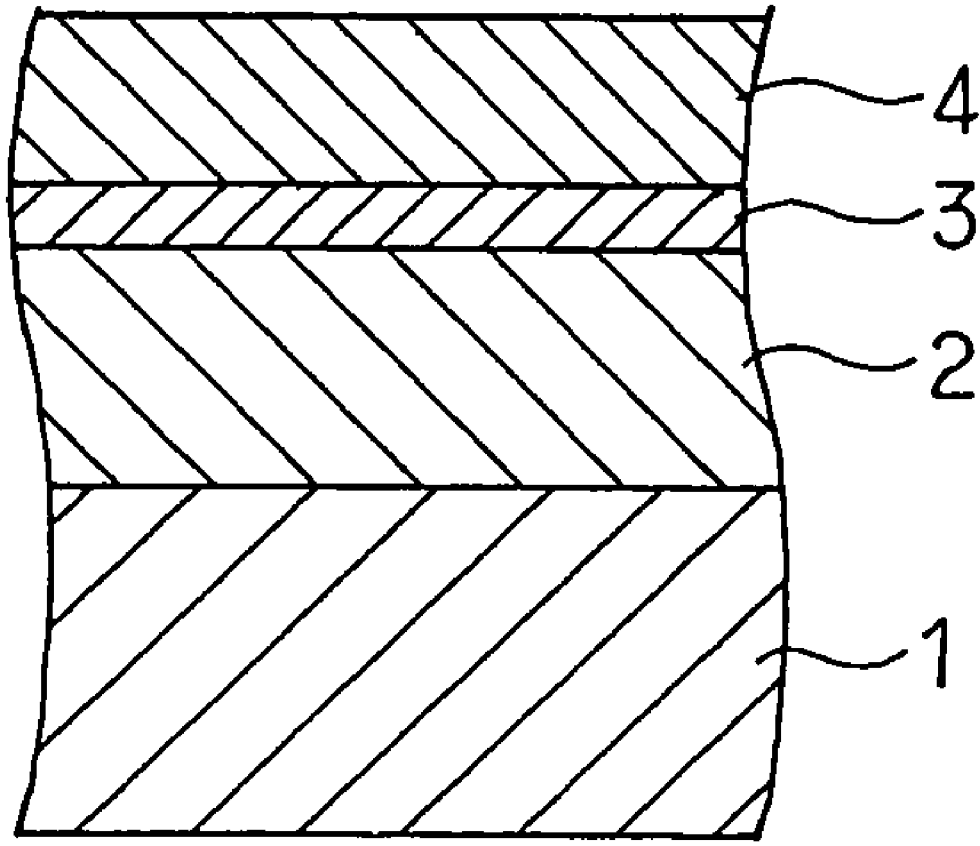
FIG. 1 is a cross-sectional view of a sliding member.

Herein below, there will be described embodiments of the present invention.

As shown in FIG. 1, a bearing alloy layer 2 made of a Cu alloy or an Al alloy was formed on a back metal layer 1 made of a steel plate, an intermediate layer 3 was formed on the bearing alloy layer 2 by electroplating, and an overlay layer 4 was formed on the intermediate layer 3 by electroplating, whereby invention specimens 1 to 6 and comparative specimens 7 to 9 were obtained as shown in following Table 1. In this case, the thickness of the intermediate layer 3 was from 0.5 to 5 μm and the thickness of the overlay layer was from 5 to 15 μm.

With regard to the intermediate layer 3, there are shown those made of an elemental Ag and of a Cu alloy. In Table 1, the numeral attached to the atomic symbol representing the intermediate layer means the content (by mass %) of the element.

The matrix of the overlay layer 4 was pure Bi, and $Si_3N_4$ and $Al_2O_3$ were used as hard particles. The overlay layers were plated by the periodic reverse current electroplating method. According to the periodic reverse current electroplating method, cathode current is periodically switched to anode current, and in general, the switching is conducted so that the period for anode current is from 10 to 20% of length relative to the period for cathode current. The longer period of anode current may result in a better leveling effect but the plating rate decreases because a Bi plating is dissolved into a plating solution during the period of anode current.

A wear test was carried out on each specimen thus obtained, results of which are shown in Table 1. Table 2 shows the conditions of the wear test.

The following is a detailed analysis of the data of Table 1.

First, comparative specimen 7 does not contain hard particles in the overlay layer and the wear amount is large. While comparative specimen 8 contains hard particles in the overlay layer in a small amount of 0.02 vol %, the wear amount is also large and no effect of the hard particles is observed. Further, while comparative specimen 9 contains hard particles in the overlay layer in a much amount of 30 vol %, the wear amount is also large.

In contrast, while invention specimen 1 contains 0.1 vol % of hard particles and invention specimen 6 contains 20 vol % of hard particles, the wear amount is small within such content range. The test results show that wear resistance can be improved by controlling the content of hard particles to the range of from 0.1 to 20 vol % as in invention specimens 1 to 6.

It is noted that the sliding member according to the present invention is suitable for a plain bearing of internal-combustion engines, but its application is not restricted thereto.

TABLE 1

| Specimen No. | Bearing alloy | Intermediate layer | Overlay component Matrix | Hard substance | Hard substance Amount (vol %) | Size (μm) | Wear Amount ($10^{-3}$ mm) |
|---|---|---|---|---|---|---|---|
| Invention specimen | | | | | | | |
| 1 | Cu alloy | Ag | Bi | $Si_3N_4$ | 0.1 | 1 | 7 |
| 2 | Cu alloy | Ag | Bi | $Al_2O_3$ | 1.5 | 1 | 7 |
| 3 | Cu alloy | Ag | Bi | $Si_3N_4$ | 2 | 1 | 6 |
| 4 | Cu alloy | Ag | Bi | $Si_3N_4$ | 5 | 2 | 5 |
| 5 | Cu alloy | Ag | Bi | $Al_2O_3$ | 7 | 2 | 7 |
| 6 | Al alloy | Cu-5Zn | Bi | $Si_3N_4$ | 20 | 3 | 5 |
| Comparative specimen | | | | | | | |
| 7 | Cu alloy | Ag | Bi | — | — | — | 14 |
| 8 | Cu alloy | Ag | Bi | $Si_3N_4$ | 0.02 | 1 | 13 |
| 9 | Al alloy | Cu-5Zn | Bi | $Si_3N_4$ | 30 | 1 | 12 |

TABLE 2

| Article | Conditions |
|---|---|
| Inner diameter of bearing | 53 mm |
| Width of bearing | 16 mm |
| Peripheral speed | 10 m/sec |
| Lubricant oil | VG22 |
| Material of shaft | JIS S55C |
| Test load | 80 MPa |
| Test time | 5 hours |

From above Table 1, it can be understood that the wear amounts of the overlay layers are not less than $10 \times 10^{-3}$ mm in the comparative specimens 7 to 9, but those in the invention specimens 1 to 6 are not more than $7 \times 10^{-3}$ mm. Apparently, the invention specimens are excellent than the comparative specimens.

What is claimed is:

1. A sliding member comprising a bearing alloy layer, an overlay layer and an intermediate layer, wherein
   (A) the overlay layer (1) is formed on the bearing alloy layer via an intermediate layer, and (2) consists of Bi, and 0.05 to 25 vol % of hard particles,
   (B) the hard particles (1) have a maximum particle size of not greater than 5 μm, and (2) are of any one selected from the group consisting of boride, suicide, oxide. nitilde, carbide and an inter-metallic compound, and
   (C) the intermediate layer is made of any one metal selected from the group consisting of Cu, Ag, and an alloy of which maior component is any one of Cu and A.

* * * * *